(12) United States Patent
Fanton et al.

(10) Patent No.: US 7,649,668 B2
(45) Date of Patent: Jan. 19, 2010

(54) TRANSPARENT WINDOW PANEL WITH A FIELD OF VIEW THAT CAN BE PARTIALLY DARKENED AND METHOD OF CONTROLLING A SURFACE ELEMENT THAT CAN BE ELECTROCHROMICALLY LIGHTENED INSIDE A TRANSPARENT WINDOW PANEL

(75) Inventors: Xavier Fanton, Aulnay Sous Bois (FR); Laurent Claude, Nemours (FR); Samuel Dubrenat, Paris (FR); Juergen Schuett, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 312 days.

(21) Appl. No.: 10/588,211

(22) PCT Filed: Feb. 3, 2005

(86) PCT No.: PCT/FR2005/050065

§ 371 (c)(1),
(2), (4) Date: Jan. 9, 2007

(87) PCT Pub. No.: WO2005/076061

PCT Pub. Date: Aug. 18, 2005

(65) Prior Publication Data

US 2007/0133078 A1 Jun. 14, 2007

(30) Foreign Application Priority Data

Feb. 5, 2004 (DE) .................. 10 2004 005 611

(51) Int. Cl.
G02F 1/15 (2006.01)
G02F 1/153 (2006.01)

(52) U.S. Cl. .................. 359/265; 359/267; 359/269; 359/273; 359/275; 359/604; 345/105; 427/108

(58) Field of Classification Search ......... 359/265–269, 359/273, 275, 350, 601, 604, 607; 345/49, 345/72, 83, 105, 106; 429/33, 304; 427/108, 427/109; 204/192.26; 396/506
See application file for complete search history.

(56) References Cited

U.S. PATENT DOCUMENTS 4,233,339 A * 11/1980 Leibowitz et al. ........... 427/108

(Continued)

FOREIGN PATENT DOCUMENTS

EP 0 304 198 2/1989

(Continued)

OTHER PUBLICATIONS

U.S. Appl. No. 11/816,487, filed Aug. 16, 2007, Fanton, et al.

*Primary Examiner*—Loha Ben
(74) *Attorney, Agent, or Firm*—Oblon, Spivak, McClelland, Maier & Neustadt, L.L.P.

(57) ABSTRACT

A transparent glazing, and a control method thereof, with a field of view that can be darkened over a portion of its surface by electrically controlling at least one functional element incorporated into a multilayer composite, the light transmission of which glazing can be varied reversibly. The functional element, for example a solid-state electrochromic multilayer system, includes at least one electrochromic functional layer enclosed between two surface electrodes. The surface electrodes and their leads are matched to one another and spaced spatially with respect to one another such that darkening starts at one edge of the functional element and, with a remaining voltage applied between the surface electrodes, propagates continuously over the surface of the functional element until it is completely and uniformly colored. The glazing can be used as an electrically controllable sunshield for windshields of vehicles or the like.

18 Claims, 1 Drawing Sheet

U.S. PATENT DOCUMENTS

Figure 1:
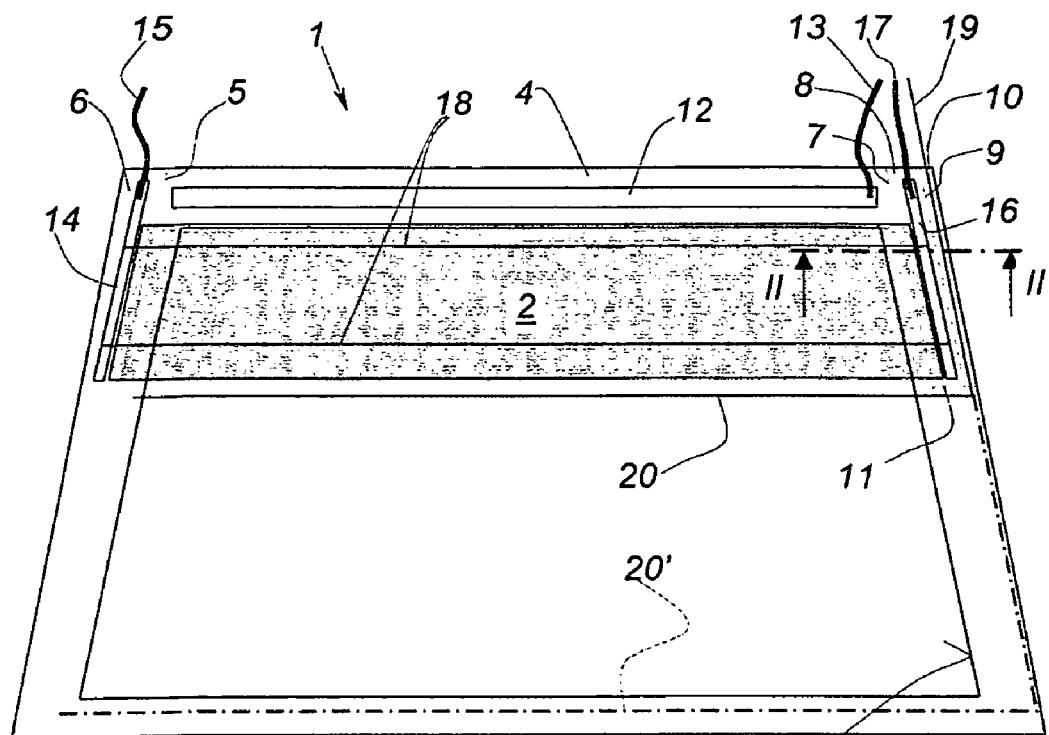

| | | | | |
|---|---|---|---|---|
| 4,475,795 A | * | 10/1984 | Leibowitz et al. | 359/267 |
| 4,586,792 A | * | 5/1986 | Yang et al. | 359/273 |
| 4,699,471 A | * | 10/1987 | Miyake et al. | 359/275 |
| 4,749,260 A | * | 6/1988 | Yang et al. | 359/275 |
| 4,878,743 A | * | 11/1989 | Aikawa et al. | 359/271 |
| 5,124,833 A | * | 6/1992 | Barton et al. | 359/269 |
| 5,187,607 A | * | 2/1993 | Endo et al. | 359/266 |
| 5,352,504 A | * | 10/1994 | Boulanger et al. | 428/216 |
| 5,523,877 A | * | 6/1996 | Lynam | 359/275 |
| 5,805,330 A | * | 9/1998 | Byker et al. | 359/265 |
| 5,877,888 A | * | 3/1999 | Coleman | 359/267 |
| 6,277,523 B1 | * | 8/2001 | Giron | 429/304 |
| 6,362,806 B1 | * | 3/2002 | Reichmann et al. | 345/105 |
| 6,535,322 B2 | * | 3/2003 | Asano et al. | 359/269 |
| 6,621,616 B1 | | 9/2003 | Bauer et al. | |
| 6,747,779 B1 | * | 6/2004 | Morin et al. | 359/265 |
| 6,798,555 B2 | * | 9/2004 | Minami et al. | 359/265 |
| 7,116,309 B1 | * | 10/2006 | Kimura et al. | 345/105 |

FOREIGN PATENT DOCUMENTS

| | | |
|---|---|---|
| EP | 0 408 427 | 1/1991 |
| FR | 2 689 655 | 10/1993 |
| FR | 2 811 778 | 1/2002 |
| WO | 93 04885 | 3/1993 |

* cited by examiner

TRANSPARENT WINDOW PANEL WITH A FIELD OF VIEW THAT CAN BE PARTIALLY DARKENED AND METHOD OF CONTROLLING A SURFACE ELEMENT THAT CAN BE ELECTROCHROMICALLY LIGHTENED INSIDE A TRANSPARENT WINDOW PANEL

The invention relates to transparent glazing with a field of view that can be partially darkened over a portion of its surface by electrically controlling at least one functional element incorporated into a multilayer composite, the light transmission of which glazing can be varied reversibly, in which portion the functional element, in particular in the form of a solid-state electrochromic multilayer system, comprises at least one electrochromic functional layer enclosed between two surface electrodes, and to a method for controlling a surface element that can be decolored electrochromically in such transparent glazing.

Documents WO 93/04885 A1 and U.S. Pat. No. 4,832,468 describe vehicle windshields, the upper edge band of which is equipped with electrochromic elements whose transparency can be varied adjustably. Consequently, the usual mechanical sunshields are superfluous or at least supplemented. The edge band may be provided over its width with separately controllable elements in such a way that it does not always have to be darkened over its entire area.

Document WO 03/007065 A1 describes an application of a solid-state electrochromic multilayer system, especially for the abovementioned objective. Document U.S. Pat. No. 6,277,523 B1 describes the chemical and physical principles of such solid-state electrochromic multilayer systems.

Document U.S. Pat. No. 5,523,877 describes in great detail various possible ways of varying the transmission of transparent laminated glazing by means of electrochromic multilayer elements. The document also indicates that the electrochromic elements may act in sunroofs, sunshields or "shading bands" in vehicles. However, in each case it is necessary to accept that the respective element can always be electrochromically darkened over its entire area.

Finally, document DE 100 46 103 A1 describes transparent glazing with a fitting that allows reversible darkening, by electrochromic means, of only certain sectors, the location of which in the surface of the glazing is determined by sensor-induced control. However, that document does not give any technical detail about the production of such glazing. In particular, it is not clear how the electrochromic layers or elements have to be deposited on the glazing.

The problem at the basis of the invention is how to provide other transparent glazing in which only a portion of the field of view is fitted with an electrochromic element, and to provide a method that allows this electrochromic element to be controlled.

According to the invention, this problem is solved by the fact that the surface electrodes of the functional element and their leads are matched to one another and spaced spatially with respect to one another in such a way that its darkening starts at one edge of the functional element and, with a continuously applied voltage applied between the surface electrodes, propagates continuously over the area of the element until it is completely and uniformly colored as regards the glazing and by the fact that the surface electrodes are produced with different surface resistance elements from which the propagation of a potential in the surface of these surface electrodes proceeds at different rates for any one voltage level, and in that an effective electrical potential is introduced into one of the surface electrodes relative to the other surface electrode, forcing the electrochromic change of color on one side of the electrochromic surface element so as to control one direction of propagation of the change of color of the electrochromic surface element.

The claims dependent respectively on the independent claims present advantageous embodiments of the invention.

Through the design, the arrangement and the local electrical control of the electrodes of the solid-state electrochromic multilayer system (hereafter called the EC system), it is possible, according to the invention, for the change of color of said system (the change being entirely reversible) to have a scrolling effect, that is to say the change of color of the system or, depending on the case, of the EC element starts on one of its edges and then propagates relatively quickly (depending on the applied electrical voltage) as far as the opposite edge. With an experimental specimen, the time needed for a complete change of color over a 15 cm width of the EC element is less than 30 seconds.

One particularly preferred application of this effect is to combine it with vehicle windshields in the configuration explained in the introduction. Here, it is possible to propagate the darkening in a scrolling fashion starting from the top edge of the windshield down to the opposite edge of the EC system located in the field of view of the glazing.

Of course, such applications may be envisaged not only in road vehicles but also for windows in airplanes, space shuttles, etc., ships and in special vehicles, and obviously also, in general but not solely, for front windows or windshields, but also for side windows or rear windows. Furthermore, other applications, in particular in the building sector, are conceivable.

According to one advantageous embodiment of the invention, the lightening propagates in the opposite direction from the darkening, namely from the bottom up, so that again a scrolling effect appears. Apart from the esthetic aspect of such an embodiment, this dynamic way in which the change of color operations take place could be more acceptable for the occupants of the vehicle than a sudden darkening over the entire area, which has to be accepted when the known EC elements are used.

Given that the color change operation propagates continuously over the area of the entire element, as long as the supply voltage is applied, it also turns out to be superior over the known subdivision of the EC elements into several individual bands that are separately controlled. This aspect apart, the arrangement of other electrodes in the region of the surface, which is covered by the electrochromic layer, and the corresponding subdivision of this layer also allow, with this technology, a subdivision into several separately controlled fields to be obtained, it then being possible for each of these fields to perform, if required, the aforementioned scrolling effect.

With one particular preference, the present invention may be used with solid-state EC multilayer systems that operate on the basis of a reversible dispersion of cations in an electrochromic functional layer. The differences in transmission and in color are the external signs of different oxidation states of the electrochromic material (which contains, for example, tungsten oxide).

The actuation of the coloration and decoloration, respectively, of the EC element may be controlled by hand via appropriate switching means. As a variant, or in combination with a manual control for the switching operations, is also possible for control to be via sensors. In this case, one or more sensors (for example photodiodes or similar photosensitive converters) may be provided on the windowpane, which is itself fitted with the EC element, or, locally, separate from the latter. One example of one possible optimized control has been described in the document DE 199 25 335 A1.

In any case, an electronic or similar control device may be provided for receiving said manual setting or control signals, and/or said sensors, and to deliver the corresponding, appropriate supply voltages to the electrodes of the EC element, that is to say at least one voltage for coloring it and another voltage for decoloring it, these two voltages being delivered to the single lead of the common surface electrode (or the "top" surface electrode in view of the illustrative example) and to one or other of the two leads, respectively, for the other surface electrode (or "bottom" surface electrode).

Further details and advantages of the subject matter of the invention will emerge from the drawings of an illustrative example and from their detailed description that follows.

Figure 2:
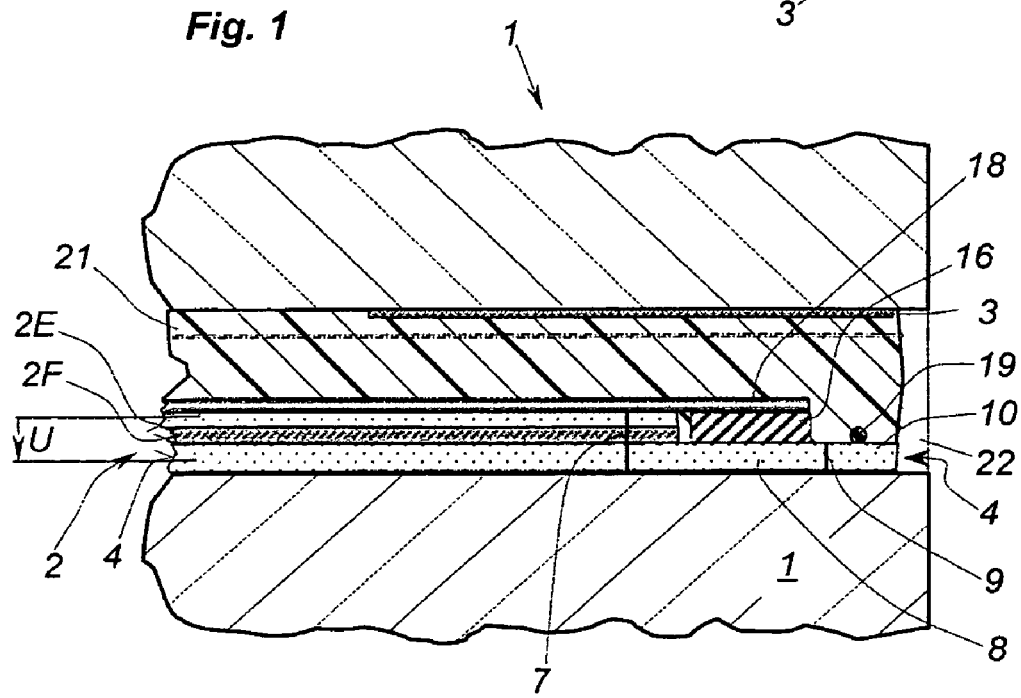

In these simplified representations, which have no particular scale,

FIG. 1 is a view of a vehicle windshield, in which the arrangement of an EC element and its electrodes is shown schematically; and FIG. 2 shows a cross section through the glazing of FIG. 1 in the region of the EC element, along the line II-II.

As shown in FIG. 1, in a windshield 1 formed by laminated glazing with a substantially trapezoidal outline, an EC element 2, also of trapezoidal outline, is placed in the region of the short parallel side of the trapezoid on that face of the glazing which is placed on the inside of the composite. In the mounted position of the windshield, it extends along the top edge of the glazing with a height of about 15 to 20 cm. Unlike the conventional sunshields, the EC element 2 entirely covers this band, even though its edges are defined short distances away from the top sides of the glazing 1.

An opaque edge region is formed as peripheral frame 3 on one face of the glazing, located on the inside of the composite, which region, as is well known, serves to mask from view, on the one hand, the bonding of the windshield 1 into the body of the vehicle and, on the other hand, the external electrical leads for the EC element. As may be seen in FIG. 2, the frame 3 and the EC element 2 are placed on different faces or lie in different planes of the glazing on the inside of the latter.

In vertical projection on the surface of the glazing, the frame 3 covers the lateral edges and the top edge of the EC element 2. However, the bottom edge of this EC element lies in the field of view of the glazing 1, surrounded by the frame 3. Unlike the simplified representation in the drawing, the transition between the opaque frame and the field of view is softened by a grid pattern of dots or the like, the edges of the EC element 2 preferably being in the fully opaque region.

In the surface region of the EC element, the light transmission is, in the unactivated state, slightly lower (approximately 60%) than in the field of view of the windshield (where it has to be at least 75% according to one European standard). This is indicated by the slight gray shading of this surface. The bottom edge of the EC element 2 is located such that the main field of view of the windshield 1, defined by the respective authorization provisions, is unaffected.

It goes without saying that it is possible, should it be necessary, to provide recesses in the surface or on the edge of the EC element, for example when it is necessary to place, behind the electrochromic region to be colored, sensors, a camera or the like, again infrared-based, the transmission paths of which have to pass through the glazing 1 and could be affected by the EC element and/or by the layers of the latter. Such recesses may advantageously be placed beneath an internal rear view mirror support bonded to the internal face of the glazing, which support may also contain the aforementioned sensors and similar devices.

In the present illustrative example, the entire surface of the glazing is covered with an electrically conductive, transparent coating 4 that serves as surface electrode close to the substrate for the EC element 2. In order for the EC element 2 to operate, it would be sufficient, however, in principle to provide the coating 4 only on the surface covered with the EC element, but with the coating extending slightly over the side of the edge.

However, complete coating is simpler to achieve, because it is then possible to dispense with partial masking of the substrate. Moreover, complete coating of the surface has the advantage that it could also, by being provided with appropriate leads (in a manner known per se), be used for heating the laminated glazing.

Although it is possible to deposit the coating before the glazing is cut, in the present case it is deposited, just as the EC element 2 itself, on the finished glazing, which optionally may be curved. The coating may include an indium tin oxide (ITO) layer, however other conductive multilayer systems, possibly composed of more than one transparent layer, which had been described several times in the prior art, may be used as surface electrode. The coating may furthermore possess thermal insulation properties (by reflecting infrared radiation).

Preferably, these coatings are deposited in a manner known per se by magnetically enhanced sputtering (sputtering/PVD process) directly on the surface of the glazing. However, it is also possible for them to be deposited by CVD processes.

Deposited directly on the electrode layer 4 is an electrochromic multilayer system (possibly comprising several layers) according to the prior art mentioned in the introduction, which forms the EC element 2. Another transparent surface electrode is again deposited, on top of the electrochromic layer, in order to form a back electrode remote from the substrate. The multilayer structure of the EC element will be explained in further detail later in relation to FIG. 2. Its layers may in all cases be deposited economically by sputtering in industrial-scale installations.

In order for the EC element to be electrically controlled in the defined manner within the meaning of the present invention, several electrical leads are required. The coating 4 and the EC element 2 are divided by a first separating line 5 and a second separating line 7 into a central field and two relatively narrow side bands 6 and 8. These bands extend parallel to the two short (oblique) sides of the trapezoid of the glazing and are located in the surface covered by the frame 3.

Provided on the right-hand side, along the right edge of the glazing 1, is another separating line 9, which separates another narrow band 10 of the coating 4 from the side band 8. Finally, there is, again at the right-hand edge of the glazing 1, a short horizontal separating line 11 that separates the bands 10 and 8 of the coating.

All the separating lines mentioned here represent complete electrical separation of the divided fields, or alternatively divided regions of the surface. Preferably, they are traced only after complete construction of the EC element (these preferably being traced by laser beam machining). However, they may also be traced firstly in the coating 4 and subsequently in the element EC 2. There can be no current flow across these separating lines within the subdivided coatings in order to avoid short circuits.

Provided in the top edge region of the frame 3, between the separating lines 5 and 7, parallel to the top side of the glazing 1, is an elongate connection band 12 connected in an electrically conducting manner to the coating 4. It includes an external lead 13 shown in a simplified manner in the form of a cable. The entire field of the coating 4 located between the separating lines 5 and 7 may be electrically supplied via the lead, in the form of a surface electrode for the EC element 2.

The EC element 2 furthermore includes an electrode remote from the substrate, with the same surface dimensions as the EC element itself (therefore corresponding to the gray area in FIG. 1), said electrode being discussed in further detail in relation to FIG. 2. This electrode may have no direct electrically conducting connection to the coating 4. However, given that the EC element 2 does not extend right up to the bottom side of the glazing 1, it is judicious to place the electrical contacts intended for contacting the electrode remote from the substrate laterally with respect to the lead for the coating 4. This therefore avoids crossover and isolation problems that could arise with an arrangement of the external leads for the electrode remote from the substrate also along the top edge of the glazing 1. Finally, it is not possible, for technical reasons, to place the connection band 12 beneath the EC element 2.

Another connection band 14 with an external lead 15 is therefore placed on the left side band 6, while still being electrically isolated from the main field of the coating 4 and from the connection band 12 by the separating line 5. Correspondingly, a third connection band 16 with an external lead 17 is placed on the right side band 8. These aforementioned leads have a low ohmic resistance compared with the coating 4.

When in the mounted state in a vehicle body, the edges of the windshield are covered with an internal coating, in such a way that said regions are, even from the inside, masked from view.

The two connection bands 14 and 16 are electrically connected to each other by means of very thin metal wires 18. These metal wires 18 are located, unlike the connection bands, over a large proportion of their length, in the field of view of the windshield. They pass through the surface covered with the EC element 2 and are connected in an electrically conducting manner to the electrode remote from the substrate of the EC element.

The wires thus form "tap-off" connections for electrically connecting the electrode remote from the substrate to the connection bands 14 and 16. It should be explicitly emphasized that two connection bands of the same polarity do not necessarily have to be provided on either side of the EC element 2, rather it is also possible, in principle, to place the wires from a single connection band, for example with free ends or forming a loop, insofar as a uniform color change of the EC element 2 with the desired scrolling effect is guaranteed.

Such arrangements of the wires are of course known in laminated electrically heated windows using arrays of heating wires. The individual wires are so thin that they are virtually imperceptible to the naked eye, and they are furthermore masked from view by the slight coloration of the EC element 2. The wires are usually made of tungsten and can support a high mechanical load so that they have the necessary robustness for being laid by a machine, despite the minimal diameter of the wires.

Finally, another electrical lead 19 is provided in the region of the right external side band 10, which lead 19 is firstly parallel to the right-hand side of the glazing and is taken beneath the separating line 11 in the field of view of the glazing, in the form of another thin wire 20 parallel to the bottom side of the EC element, this wire being connected, as a direct electrical conducting link, to the coating 4. The lead 19 and the wire 20 are electrically isolated from the connection band 16 by the separating lines 9 and 11. However, they are connected in an electrically conducting manner to the connection band 12 via the coating 4 and are thus, in principle, at the same electrical potential as the latter. Although the lead 19 has again been shown here as a line, it may however also be made in the form of a connection band in the region of the opaque frame if the available width is sufficient.

For the sake of clarity, the mutual distances between the bottom edge of the EC element, the separating line 11 and the horizontal portion of the lead 19 have been exaggerated. In mass-produced glazing, the horizontal portion 20 of the lead 19 will be brought as close as possible to the bottom side of the EC element 2.

At this point, it should be emphasized that, if the requirement is for the surface supply of the operating voltages and currents for the EC element into the two surface electrodes to be as uniform as possible, more than two wires 18 and more than one wire 20 may be provided.

If, as mentioned here, the coating 4 completely covers the entire surface of the glazing, the wire lead 19/20—or instead of this also a wider connection band similar to the connection band 12—may in principle also be placed at the bottom side of the glazing 1, again in the surface covered by the frame 3 outside the field of view of the glazing 1, as indicated by the dot-dash lines 20' in FIG. 1. However, the response behavior of the EC element 2 during lightening may thus be delayed more strongly, relative to the application of the switching voltages, than in the case of the embodiment indicated in solid lines because, because of the significant surface resistance of the coating 4, even when the potential is applied to the coating, the supply voltage can increase only slowly through the EC layer. The figure shows that, near the top right corner of the laminated glazing 1, three electrical leads 13, 17 and 19 are grouped very closely together, whereas the electrical lead 15 is placed in the top left corner. Of course, it is possible for the leads of the same polarity, 13 and 15, to be connected directly together by providing, preferably, in the surface region or the lateral band covered with the opaque frame 3, parallel to the connection band 12, a line for direct connection between them. However, this line must be electrically isolated from that surface region of the coating 4 which is located between the side bands 6 and 8. For example, a flat cable could be provided for this purpose, which cable includes (at least) an electrically conducting track on a nonconducting (plastic) support. All in all, it is necessary to bring together, at one place, all the external leads for the EC element (and possibly for other electrical functional elements of the glazing 1) and to bring them into contact with the electrical circuit of the vehicle or with an electronic control unit, where necessary using a multiple connector or a multiple soldered lead.

The internal structure of the composite windshield 1 will now be explained with reference to FIG. 2, which shows the windshield seen in cross section along the line of section II-II of FIG. 1. Identical components have been given the same numerical references as in FIG. 1. This figure shows two individual rigid panes 1 (made of glass or plastic) and a layer of electrically insulating and visually transparent adhesive 21, which bonds them together adhesively in the usual manner. This layer is divided horizontally by a dot-dash line so as to indicate that it is in fact substantially thicker than the EC element 2 or than the individual layers of the latter. The material of the adhesive layer must be chosen according to its compatibility with the production of the layers of the EC element 2.

Corresponding references are found in the literature mentioned in the introduction. Because of their strong hygroscopic properties, the usual adhesive films, made of PVB, are less considered here. At present, thermoplastic polyurethane adhesive films are preferred, although other materials may also be envisaged. The functional layer of the EC element 2 has to have a defined water content, which cannot be removed from it by the material of the film.

Mounted as a vehicle windshield, the top pane in FIG. 2 is placed on the outside and the bottom pane is turned toward the passenger compartment inside the vehicle. This figure shows, on the right-hand edge, the position of the frame 3 on the surface of the top pane located on the inside of the composite (in the jargon of glazing experts, on the face 2 of the laminated glazing). On the internal face of the bottom pane facing it (face 3), the coating 4 is deposited directly as bottom electrode of the EC element 2. To reduce the aforementioned risk of dehydration of the EC element even further, the layer of adhesive 21 of the laminated glazing may be sealed by an external peripheral seal 22 (for example with a butyl sealant).

On the left edge of the section there is a functional layer 2F on the coating 4, and above this functional layer is another surface electrode 2E for the EC element 2. Said functional layer and said surface electrode extend toward the right beyond the separating line 7 but they terminate, however, before the separating line 9, these being indicated by bold vertical lines. The functional layer 2F is shown here in a simplified manner in the form of a single layer. In fact, it is composed of several individual layers, but it is unnecessary to describe these in detail here because they may be considered as being known.

It may be seen that the separating line 7 passes through all the layers of the EC element 2, namely the surface electrode 2E, the functional layer 2F and the coating 4, and it electrically separates them from the lateral band 8. However, it would also be possible to interrupt the coating 4 and the layers of the EC element 2 with a lateral offset. A short circuit via these separating lines would then not be acceptable either, because the functional layer 2F of the EC element exhibits anisotropic conductivity, that is to say it has a much higher resistance over its surface than normal to the surface (i.e. directly between the surface electrodes 4 and 2E).

Only the wire 18 goes beyond this separating line and thus represents the conducting electrical connection between the surface electrode 2E and the connection band 16 (if several wires 18 are provided, as in FIG. 1, each of them must of course be extended beyond the separating line). Direct connection of the lateral band 8, or the connection band 16, respectively, with the central region of the surface—surrounded by the frame 3—of the coating 4 is prevented by the separating line 7. Admittedly, it would be conceivable to provide the separating line 7 (and the separating line 5 that corresponds to it on the other side) exactly alongside the lateral end of the EC element, however this is more expensive than the embodiment shown here and provides no technical/electrical advantage.

The wire 18 also overcomes the difference in height, unavoidable in the actual configuration of such a glazing unit, between the respective connection bands 16 and 14 (which are relatively thicker) and the thinner EC element 2.

For producing the electrical leads, the adhesive film 21 is equipped before assembly of the individual layers of the laminated glazing. On its face placed on the EC element 2 in the mounting position, it bears in particular the connection bands 12, 14, 16, the wires 18, 19 and 20 and, where necessary, also the external leads 13, 15 and 17 insofar as these are introduced into the composite, each time in the positions shown in FIG. 1. It is also possible to provide certain line-guiding means on the back of this film, for example the direct connection mentioned above between the connection bands 14 and 16, possibly also the line 19.

The wires 18 may be connected in an electrically conducting manner to the connection bands 14 and 16 by soldering, or alternatively by incorporation in a layer of solder; this is also valid for any connection necessary between lines 19 and 20 produced separately. All the connecting parts are finally mechanically fastened in a reliable and permanent manner and brought into electrical contact after the layer of adhesive 21 and the second individual pane of the composite have been put into position, by the action of heat and pressure (for example in an autoclave). In this case, the connection band 12 and the wire 20 are again in sufficiently intimate contact with the coating 4, and the wires 18 in contact with the electrode 2E.

Should it be necessary to prevent the coating 4 from corroding starting from the edge of the glazing, the coating 4 will be terminated well before the external side of the glazing. If it had been temporarily deposited over the entire surface, as already mentioned above, it then can again be removed along the sides of the glazing using suitable methods known per se. In the case of an ITO coating, such cleaning of the edges is not absolutely necessary. However, in this case external sealing with the seal 22 is also necessary. Likewise, the separating lines 5 and 7 already provide a degree of protection against penetration of the corrosion.

The way in which the EC element and its leads are used will now be explained below. In general, to operate the EC element it is necessary to provide an electronic control unit (not shown), for example of the type described in document DE 199 25 335 A1, which may provide, at various outputs, well-defined positive and negative voltage levels. If necessary, this control unit is also connected to sensors which can automatically darken the EC element, for example when there is a risk of the driver being dazzled when the sun is low on the horizon.

During the darkening process, the connection band 12 is used as positive electrode for applying a positive voltage to the coating 4. Given that it has a low ohmic resistance compared with the latter, its electrical potential is communicated over its entire length to the coating 4. During application of the voltage, said voltage can increase only relatively slowly over the surface of the coating 4 (which has, for example, a resistance of about 6-7 ohms per unit area).

In the case of the example, the surface electrode 2E has also been intentionally deposited with a surface resistance of about 60-70 ohms per unit area, which is therefore much higher than the surface resistance of the coating 4. This may be influenced and controlled, during deposition of the coating by sputtering, by suitably adjusting the working parameters and through the composition of the material of this electrode layer.

The functional layer 2F of anisotropic conductivity has a very low electrical resistance perpendicular to the surface electrodes 2E and 4.

Indicated below are the relationships between the resistances: $R_{2F} \ll R_4 < R_{2E}$, where R each time represents the ohmic resistance. Consequently, one can count on a practically immediate exchange of charges at the moment when a sufficiently high voltage (the potential difference across the functional layer 2F) exists in any region between the electrodes 4 and 2E.

This voltage (indicated on the left-hand edge by the arrow and by U between the coating 4 and the surface electrode 2E) causes the EC functional layer 2F to darken by charge exchange.

Particularly advantageously, the voltage is chosen in such a way that, combined with the careful determination of the resistances of the layers of the surface electrodes, the functional layer starts to darken at its slightly narrower top edge so that a scrolling effect, which propagates in a few seconds as far as the bottom edge of the EC element, is observed.

The substantial difference in conductivity of the two surface electrodes 2E and 4 is considered as the initiator of the desired scrolling effect according to the invention. For the same voltage value, a sufficient supply voltage applied will propagate more rapidly in the surface of the coating 4 than in the surface of the surface electrode 2E.

Intellectually, this may be represented as the advance of a voltage front or a high charge-changing current (transporting and dispersing the cations) flowing briefly in the functional layer, starting from the point of application of the driving voltage up to the end of the surface electrode.

However, in the final static state a uniform coloration of the EC element over the entire surface is achieved. This lasts as long as the supply voltage on the functional layer 2F is kept at a constant level or is at least pulsed. The decoloration (reverse ion exchange) of the EC functional layer 2F takes place with a relative delay, so that it is sufficient to have a pulsed voltage supply.

In an experimental glazing unit with such an EC element, a voltage of 1.55 V (DC voltage) was applied for the darkening. This resulted in darkening in less than 30 seconds for an EC-element height of about 15 cm.

If there is no voltage between the surface electrodes 4 and 2E (0 V), the EC element 2 will again lighten little by little, returning to its essentially transparent natural tonality, without other provisions, owing to the fact that the electrical charges contributing to the darkening again resume their initial state. The method of operating the EC element 2 corresponds substantially to that of an accumulator.

However, it is possible, by means of the additional electrode formed by the lead 19/20 (which could also, as mentioned earlier, be located on the bottom edge of the glazing 1), to cause the lightening to scroll up from the bottom edge of the EC element 2, therefore in the opposite direction to the darkening, having the effect of a roll being wound up.

For this purpose it is necessary, after the voltage on the connection band 12 has been cut off, to apply a reverse voltage relative to the darkening voltage U between the wire portion 20 (and the coating 4) and the surface electrode 2E, which does not necessarily have to have the same value as the darkening voltage.

The scrolling effect then again appears owing to the difference in surface resistances of the electrode layer 4 and the upper electrode layer 2E. Their higher resistance determines at which speed the current, for again extracting or removing the cations from the functional layer, flows, the resistance of the functional layer 2F being, as mentioned, negligible and even lower during discharging than during dispersion of the cations.

Likewise, the portion 20 of the third lead has an ohmic resistance that is really small compared with the surface electrodes 4 and 2E, so that it is possible to observe here the same behavior as that during supply by the connection band 12.

Of course, it would also be possible to reverse the "direction of movement" of the scrolling effect, that is to say make the darkening start in the field of view of the window glazing (if the darkening voltage were to be applied via the lead 19/20), or to make the darkening start simultaneously from two opposed sides of the EC element via simultaneous supply from the leads 12 and 19/20. If it is desired to produce several separately controlled fields with this EC element, these must be separated from one another by horizontal separating lines and must each be provided with their own "cap-off" electrodes.

The invention claimed is:

1. A transparent glazing with a field of view that can be darkened over a portion of its surface by electrically controlling at least one functional element incorporated into a multilayer composite, the light transmission of which glazing can be varied reversibly, in which portion the functional element comprises:
   at least one electrochromic functional layer enclosed between two surface electrodes,
   wherein each surface electrode of the functional element, and leads corresponding thereto, are matched and spatially spaced relative to the other surface electrode such that darkening starts at one edge of the functional element and, with a continuously-applied voltage applied between the surface electrodes, propagates continuously over the surface of the functional element until the functional element is completely and uniformly colored.

2. The transparent glazing as claimed in claim 1, wherein at least one of the surface electrodes is connected to at least one connection conductor having a low ohmic resistance, which conductor is parallel to and is placed close to a lateral edge of the functional element.

3. The transparent glazing as claimed in claim 1, wherein at least one of the surface electrodes includes a left and right connection conductor respectively placed on a left and right side of the functional element, the left and right connection conductors being of low ohmic resistance, each of the left and right connection conductors being operable to receive electrical potentials via external leads independently of the other of the left and right connection conductor.

4. The transparent glazing as claimed in claim 3, wherein the left connection conductor is placed near the left side of the glazing in a region between a boundary located in the field of view and a left edge of the glazing and the right connection conductor is placed on the right side of the functional element in a region between a boundary located in the field of view and a right edge of the glazing.

5. The transparent glazing as claimed in claim 4, wherein the right connection conductor, which is in the field of view of the glazing, is in a form of at least one thin metal wire.

6. The transparent glazing as claimed in claim 1, wherein the functional element extends along one side of the glazing and, from the one side, into the field of view of the glazing, the darkening of which field of view starts in the region of the one side.

7. The transparent glazing as claimed in claim 1, wherein the functional element extends from a top side of the glazing and between a front and rear side, in which glazing one of the two surface electrodes is brought into electrical contact at an outer surface of the glazing from at least one surface of the front and rear sides, one of the front side and the rear side forming a substrate for the functional element.

8. The transparent glazing as claimed in claim 7, wherein the surface electrode remote from the electrochromic funcational layer is electrically connected to at least one lead lying at an edge of the glazing by at least one thin metal wire extending over a surface of the functional element that lies in a field of view of the glazing.

9. The transparent glazing as claimed in claim 1, wherein the surface electrode closest to the electrochromic functional layer is in a form of a substantially complete coating of the glazing, the functional element is formed only over a portion of the coating such that lateral bands not covered by the functional element are formed on at least two sides of the glazing forming an angle therebetween, the lateral bands of the surface electrode are electrically isolated from one another, and connection conductors, one of which is electrically connected to the surface electrode closest to the electrochromic functional layer and the other of which is electrically connected to the surface electrode furthest from the electrochromic functional layer of the functional element, are provided on each of the lateral bands.

10. The transparent glazing as claimed in claim 1, wherein the two surface electrodes have different surface resistances.

11. The transparent glazing as claimed in claim 10, wherein the surface electrode closest to the electrochromic functional layer has a lower surface resistance than the surface electrode furthest from the electrochromic functional layer.

12. The transparent glazing as claimed in claim 10, wherein the surface resistance of the surface electrode closest to the electrochromic functional layer lies within a range from 0.01 to 100 ohms per unit area and wherein the surface resistance of the surface electrode furthest from the electrochromic functional layer is about 10 times these values.

13. The transparent glazing as claimed in claim 1, wherein an opaque edge frame extends over at least a portion of a perimeter of the glazing along the edge of the glazing, and wherein electrical leads for the surface electrodes are placed on the surface of this edge frame.

14. The use of transparent glazing as claimed in claim 1 as a windshield for a vehicle, in which the functional element is an all-solid-state electrochromic multilayer system placed, as an electrically controllable sunshield, in a region of a top edge in a mounted state.

15. A method for controlling a functional element in an all-solid-state electrochromic surface element in a transparent glazing unit, which all-solid-state surface element includes a functional layer that can be reversibly decolored electrochromically, the method comprising:
introducing, between two surface electrodes, an electrical potential to force an electrochromic change of color on one side of the electrochromic surface element, a direction of propagation of a change of color of the electrochromic surface element being controlled by an increase in an electrical potential on a surface of one surface electrode relative to the other surface electrode,
wherein each of the two surface electrodes has a different surface resistance and a rate of increase of the electrical potential depends on the surface resistance of each of the two surface electrodes.

16. The method as claimed in claim 15, wherein at least one supply lead for electrical potentials causing the electrochromic color change is provided on at least one of the surface electrodes on either side of the all-solid-state electrochromic surface element.

17. The method as claimed in claim 15, wherein a first effective potential is applied via a first supply lead for a surface electrode relative to the other surface electrode to induce a coloration in a predetermined direction of propagation of the color change, and wherein a second effective potential, of reverse polarity, is applied via a second supply lead for a surface electrode relative to the other surface electrode to produce decoloration in a predetermined direction of propagation of the color change.

18. The method as claimed in claim 15, in an application for controlling an electrochromic functional element incorporated as a sunshield in a windshield of a vehicle.

* * * * *